United States Patent
Yoshizuka (10) Patent No.: US 9,200,891 B1
(45) Date of Patent: Dec. 1, 2015

(54) MOLDING WALL THICKNESS RECOGNITION APPARATUS, MOLDING WALL THICKNESS RECOGNITION SYSTEM, AND NON-TRANSITORY COMPUTER READABLE MEDIUM

(71) Applicant: FUJI XEROX CO., LTD., Tokyo (JP)

(72) Inventor: Masanori Yoshizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/617,194

(22) Filed: Feb. 9, 2015

(30) Foreign Application Priority Data

Jun. 30, 2014 (JP) ................................. 2014-135249

(51) Int. Cl.
  *G01B 11/28* (2006.01)
  *G01B 11/06* (2006.01)
  *B29C 37/00* (2006.01)

(52) U.S. Cl.
  CPC .............. *G01B 11/06* (2013.01); *B29C 2037/90* (2013.01); *B29C 2037/903* (2013.01)

(58) Field of Classification Search
  CPC ........... G01B 11/0625; G01B 11/0683; G01B 11/06; B24B 37/013; B24B 49/12
  USPC .......................................................... 356/630
  See application file for complete search history.

(56) References Cited

U.S. PATENT DOCUMENTS

| 4,192,701 | A | * | 3/1980 | Martin et al. ................. 156/285 |
| 6,365,092 | B1 | * | 4/2002 | Backa et al. .................. 264/628 |
| 2003/0223086 | A1 | * | 12/2003 | Semersky et al. ............. 356/630 |
| 2006/0145395 | A1 | * | 7/2006 | Takigawa ................... 264/297.2 |
| 2008/0298727 | A1 | * | 12/2008 | Edgington et al. ............ 383/105 |

FOREIGN PATENT DOCUMENTS

| JP | 2007168424 A | 7/2007 |
| JP | 2008122580 A | 5/2008 |
| JP | 2009271781 A | 11/2009 |

* cited by examiner

*Primary Examiner* — Tarifur Chowdhury
*Assistant Examiner* — Md Rahman
(74) *Attorney, Agent, or Firm* — Oliff PLC (57) ABSTRACT

Provided is a molding wall thickness recognition apparatus, including a calculation portion that calculates a surface area of each surface that configures a molded article in each wall thickness, based on three-dimensional shape information which illustrates a shape of the molded article having different wall thicknesses, and a determining portion that determines the wall thickness of the surface area that satisfies preset conditions as a basic wall thickness, by comparing each surface area in each wall thickness calculated by the calculation portion.

13 Claims, 8 Drawing Sheets

MOLDING WALL THICKNESS RECOGNITION APPARATUS, MOLDING WALL THICKNESS RECOGNITION SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-135249 filed Jun. 30, 2014.

BACKGROUND

Technical Field

The present invention relates to a molding wall thickness recognition apparatus, a molding wall thickness recognition system, and a non-transitory computer readable medium.

SUMMARY

According to an aspect of the invention, there is provided a molding wall thickness recognition apparatus, including:

a calculation portion that calculates a surface area of each surface that configures a molded article in each wall thickness, based on three-dimensional shape information which illustrates a shape of the molded article having different wall thicknesses; and a determining portion that determines the wall thickness of the surface area that satisfies preset conditions as a basic wall thickness, by comparing each surface area in each wall thickness calculated by the calculation portion.

BRIEF DESCRIPTION OF THE DRAWINGS

Exemplary embodiments of the present invention will be described in detail based on the following figures, wherein.

DETAILED DESCRIPTION

Figure 1:
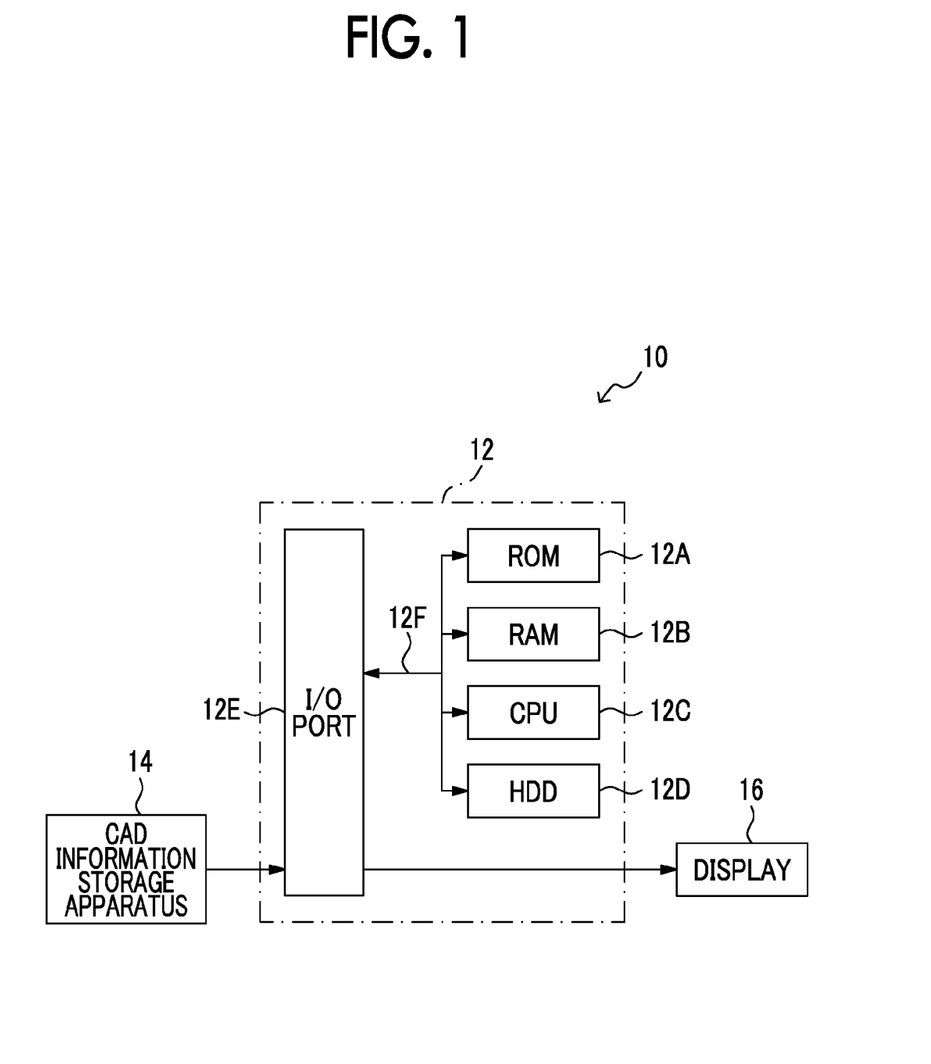
FIG. 1 is a view illustrating a schematic configuration of a molding wall thickness recognition system which includes a molding wall thickness recognition apparatus according to an exemplary embodiment.

Hereinafter, the exemplary embodiment will be described with reference to the drawings. FIG. 1 is a view illustrating a schematic configuration of a molding wall thickness recognition system which includes a molding wall thickness recognition apparatus according to the exemplary embodiment. In addition, a molding wall thickness recognition apparatus 12 configures a part of a design support apparatus which performs design of a molded article that configures a product, such as a mechanical product, or setting of a mold or the like, and has a function of recognizing a basic wall thickness of the molded article of the design support apparatus.

As illustrated in FIG. 1, a molding wall thickness recognition system 10 according to the exemplary embodiment is provided with a computer aided design (CAD) information storage apparatus 14 and the molding wall thickness recognition apparatus 12.

In the molding wall thickness recognition apparatus 12, the CAD information storage apparatus 14 and a display 16 are connected to each other. In the CAD information storage apparatus 14, three-dimensional shape information (hereinafter, referred to as CAD information) which is generated by CAD and illustrates a shape of the molded article having various wall thicknesses is stored. The CAD information storage apparatus 14 stores, for example, front surface information illustrating each front surface of the molded article, or boundary line information illustrating coordinates or the like of both ends of each boundary line of the molded article. In the display 16, information on the shape of the molded article, or the boundary line or the wall thickness of each surface of the molded article or the like, is displayed.

Furthermore, the molding wall thickness recognition apparatus 12 is provided with a read only memory (ROM) 12A, a random access memory (RAM) 12B, a central processing unit (CPU) 12C, a hard disk drive (HDD) 12D, and an I/O (input and output) port 12E. The ROM 12A, the RAM 12B, the CPU 12C, the HDD 12D, and the I/O port 12E are connected to each other via a bus 12F. In other words, the molding wall thickness recognition apparatus 12 has a function of a computer.

In the ROM 12A as a recording medium, a basic program, such as an OS, is stored. In addition, in the ROM 12A of the exemplary embodiment, a program for executing various types of processing, such as basic wall thickness recognition processing or wall thickness confirmation part derivation processing, which will be described later, is stored.

The CPU 12C executes the various types of processing by reading various programs from the ROM 12A and developing the programs in the RAM 12B. The RAM 12B functions as an operation region in which various types of data are temporarily stored when various programs are executed. The CAD information storage apparatus 14 and the display 16 are connected to the I/O port 12E, and the various types of processing are performed as the CPU 12C acquires the CAD information stored in the CAD information storage apparatus 14, and a processing result or the like is displayed in the display 16.

Figure 2:
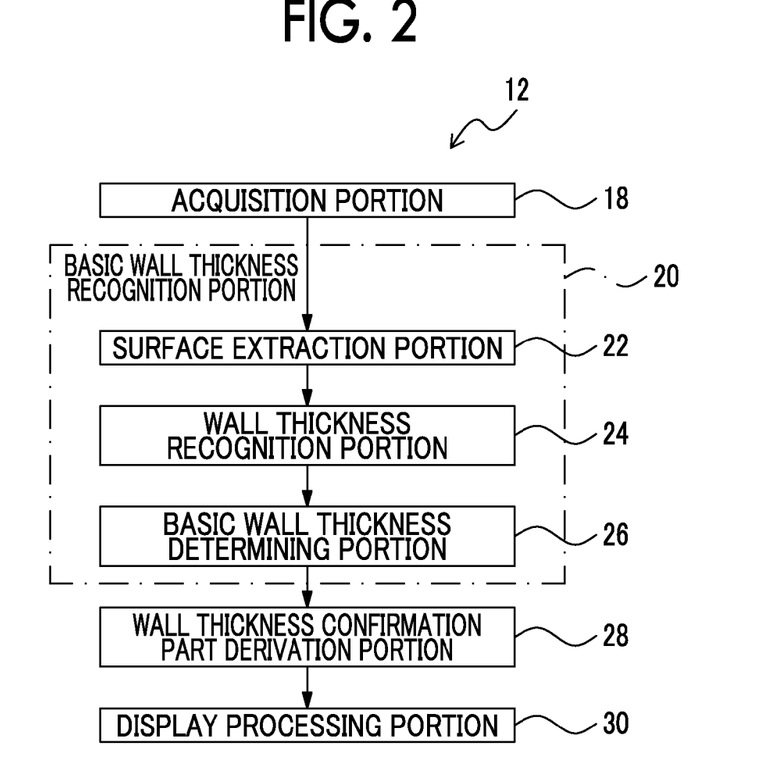
FIG. 2 is a functional block diagram illustrating functions of the molding wall thickness recognition apparatus according to the exemplary embodiment.

Next, functions of the molding wall thickness recognition apparatus 12 according to the exemplary embodiment will be described. FIG. 2 is a functional block diagram illustrating the functions of the molding wall thickness recognition apparatus 12 according to the exemplary embodiment.

As illustrated in FIG. 2, the molding wall thickness recognition apparatus 12 has functions of an acquisition portion 18, a basic wall thickness recognition portion 20, a wall thickness confirmation part derivation portion 28, and a display processing portion 30. Each function is realized by executing various programs as illustrated above in the exemplary embodiment.

The acquisition portion 18 acquires the CAD information which includes the front surface information or the boundary line information stored in the CAD information storage apparatus 14.

The basic wall thickness recognition portion 20 includes a surface extraction portion 22, a wall thickness recognition portion 24, and a basic wall thickness determining portion 26.

The surface extraction portion 22 extracts each surface of the molded article from the CAD information acquired by the acquisition portion 18. By extracting the surfaces, for example, surface information is acquired from the CAD information illustrating the shape of the molded article, and by considering an intersection point of a grid at a preset interval on each surface as a normal line arithmetic point, a normal line of the normal line arithmetic point is computed. Based on a direction of the computed normal lines of each surface, and a preset relative movement direction (demolding direction) of a cavity mold and a core mold which configure the mold for molding the molded article, various surfaces which configure the molded article are extracted. As an example, regarding a surface which configures the molded article, the surface extraction portion 22 extracts a standing wall which is a surface parallel to the demolding direction, a facing surface which is a surface facing the cavity mold or the core mold, or a both sides undersurface which is a surface that is not be molded by any one of the cavity mold and the core mold. In addition, a specific extracting method of a surface uses technologies described, for example, in Japanese Patent No. 5187457, Japanese Patent No. 4488060, Japanese Patent No. 4623134, and Japanese Patent No. 501313.

Figure 3:
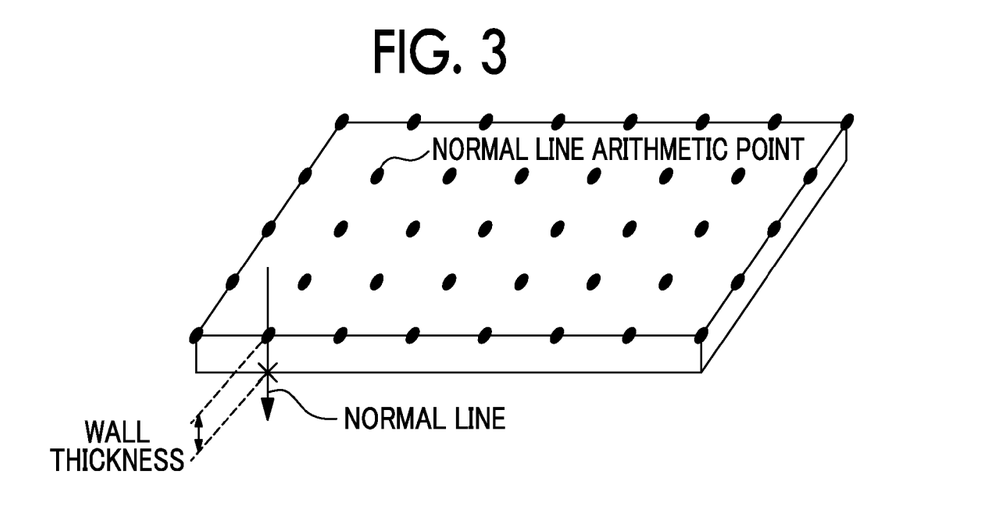
FIG. 3 is a view illustrating an obtaining method of a wall thickness of each surface of a molded article.

The wall thickness recognition portion 24 recognizes the wall thickness of each surface extracted by the surface extraction portion 22. For example, as illustrated in FIG. 3, each surface is irradiated with a virtual projection beam along the normal line direction of the preset normal line arithmetic point, a surface which intersects the projection beam is obtained, and a distance from the normal line arithmetic point to the obtained surface is recognized as the wall thickness. In addition, each point of FIG. 3 illustrates the normal line arithmetic point.

The basic wall thickness determining portion 26 determines the basic wall thickness, based on the wall thickness of each surface recognized by the wall thickness recognition portion 24. In the exemplary embodiment, by calculating a surface area of each wall thickness and by considering the entire unevenness including the standing wall, a wall thickness having the largest area is considered as the basic wall thickness. In addition, in a plane portion and the standing wall, the wall thickness of a plane portion is considered as the basic wall thickness. Specifically, the surface area of each wall thickness of each surface including the standing wall is calculated. When the wall thickness having the largest surface area is equal to or larger than a preset value times (in the exemplary embodiment, equal to or greater than 2 times) as large as a wall thickness having the second largest surface area, the wall thickness having the largest surface area is determined as the basic wall thickness. In addition, when the wall thickness having the largest surface area is less than two times as large as the wall thickness having the second largest surface area, the surface area of each wall thickness excluding the standing wall is calculated. When the wall thickness having the largest wall surface is equal to or greater than two times as large as the wall thickness having the second largest surface area, on a surface excluding the standing wall, the wall thickness having the largest surface area is determined as the basic wall thickness. Meanwhile when the wall thickness having the largest surface area is less than two times as large as the wall thickness having the second largest surface area, on the surface excluding the standing wall, the wall thickness having the second largest surface area is determined as the basic wall thickness. Here, when the wall thickness exceeds the preset value (for example, 2 mm), since a filling ability of a resin is ensured, the wall thickness having the second largest surface area among the small wall thicknesses is considered as the basic wall thickness, with considering cost or safety.

In addition, when the surface area of each wall thickness is, for example, set as an area S which receives attention among the surfaces extracted by the surface extraction portion 22, S×(number of the normal line arithmetic points included in a part of an attention wall thickness)÷(number of normal line arithmetic points included in an attention surface) is calculated.

The wall thickness confirmation part derivation portion 28 derives a part, which has a possibility that deformation of the molded article appears, as a confirmation part, based on the basic wall thickness determined by the basic wall thickness determining portion 26.

Figure 4A:
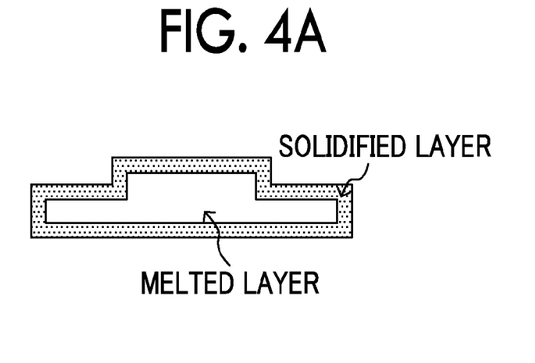
FIGS. 4A to 4C are views illustrating generation of sinking on a front surface of the molded article.
Figure 4B:
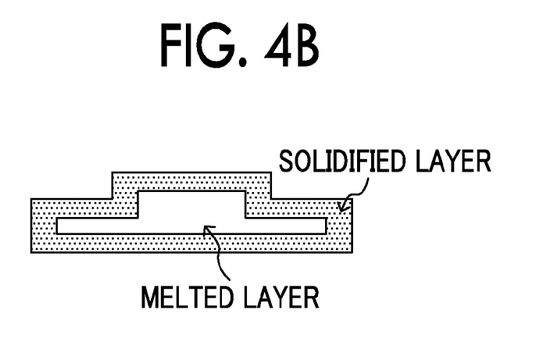
Figure 4C:
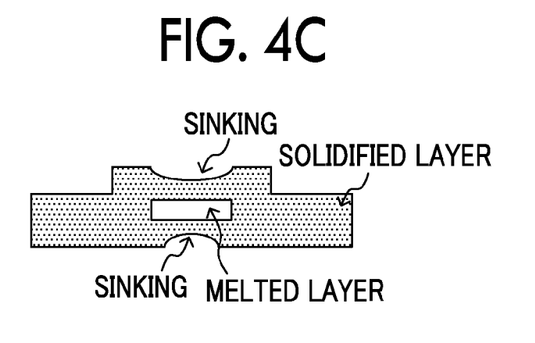

However, a volume of the resin changes when being melted and being solidified, and generally, the volume of the resin, contracts when being solidified from a melted state. A temperature right after taking out the molded article from the mold is higher than room temperature, and becomes room temperature as times passes. At this time, the molded article contracts as cooling is performed. In general, if the wall thickness of the molded article increases, a molding shrinkage ratio tends to increase, and if the wall thickness of the molded article increases, sinking is likely to be generated on the front surface. For example, when a part which has different wall thickness in the molded article exists, the melted resin is solidified from the front surface of the molded article, and as time passes, as illustrated in FIGS. 4A, 4B, and 4C in order, the solidification is performed in order from the front surface, and finally, the inside is solidified. As the inside is solidified after the front surface is solidified, deformation, such as sinking, is generated on the front surface by the contraction caused by the solidification of the inside. Here, the wall thickness confirmation part derivation portion 28 derives a part of the wall thickness having a possibility that a defect, such as sinking, is generated as the confirmation part, without following the CAD information with respect to the basic wall thickness. In the exemplary embodiment, the wall thickness confirmation part derivation portion 28 derives a part of the wall thickness in a range from basic wall thickness×A to basic wall thickness×A+B (A and B are respectively preset values).

The display processing portion 30 displays the derived confirmation part on the display 16 by the wall thickness confirmation part derivation portion 28. For example, the wall thickness in a range from basic wall thickness×A to basic wall thickness×A+B is displayed in a state which is different in every preset range. As a different state display, for example, the wall thickness in the range from basic wall thickness×A to basic wall thickness×A+B is classified by every preset range, and the corresponding confirmation portion part is displayed by a color which corresponds to the wall thickness.

Figure 5:
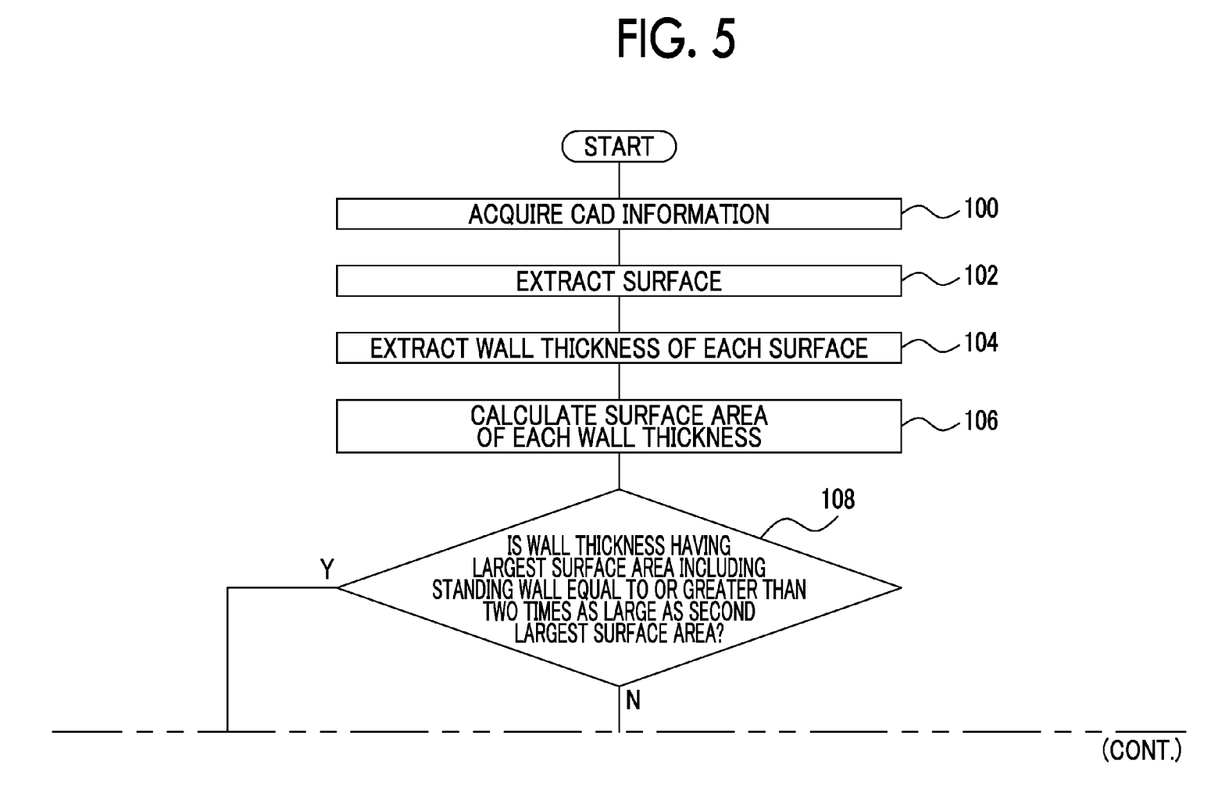
FIG. 5 is a flow chart illustrating an example of a flow of a basic wall thickness recognition processing which is performed by a basic wall thickness recognition portion of the molding wall thickness recognition apparatus according to the exemplary embodiment.

Next, specific processing which is performed in the molding wall thickness recognition apparatus 12 according to the exemplary embodiment configured as described above will be described. FIG. 5 is a flow chart illustrating an example of a flow of the basic wall thickness recognition processing which is performed by the basic wall thickness recognition portion 20 of the molding wall thickness recognition apparatus 12 according to the exemplary embodiment.

In a step 100, the acquisition portion 18 acquires the CAD information stored in the CAD information storage apparatus 14, and moves to a step 102.

In the step 102, the surface extraction portion 22 extracts each surface of the molded article from the CAD information acquired by the acquisition portion 18, and moves to a step 104. For example, as illustrated above, the surface extraction portion 22 acquires the surface information from the CAD information, and computes the normal lines of the normal line arithmetic points of each surface. Based on the direction of the computed normal lines of each surface, and the preset relative movement direction (demolding direction) of the cavity mold and the core mold which configure the mold for molding the molded article, various surfaces which configure the molded article are extracted.

In the step 104, the wall thickness recognition portion 24 recognizes the wall thickness of each surface extracted by the surface extraction portion 22, and moves to a step 106. In other words, the wall thickness recognition portion is irradiated with the virtual projection beam along the normal line direction of the normal line arithmetic points of each surface, obtains a surface which intersects the projection beam, and recognizes a distance from the normal line arithmetic point to the obtained surface as the wall thickness.

In the step 106, the basic wall thickness determining portion 26 calculates the surface area of each wall thickness of each surface, and moves to a step 108. For example, when the surface which receives attention among the surfaces extracted by the surface extraction portion 22 is set as the area S, the basic wall thickness determining portion 26 calculates the area surface by calculating S×(number of the normal line arithmetic points included in apart of an attention wall thickness)÷(number of normal line arithmetic points included in the attention surface).

In the step 108, the basic wall thickness determining portion 26 evaluates whether or not the wall thickness having the largest surface area including the standing wall is equal to or greater than two times as large as the second largest surface area. When the evaluation is positive, the process moves to a step 110, and when the determination is negative, the process moves to a step 112.

Figure 6:
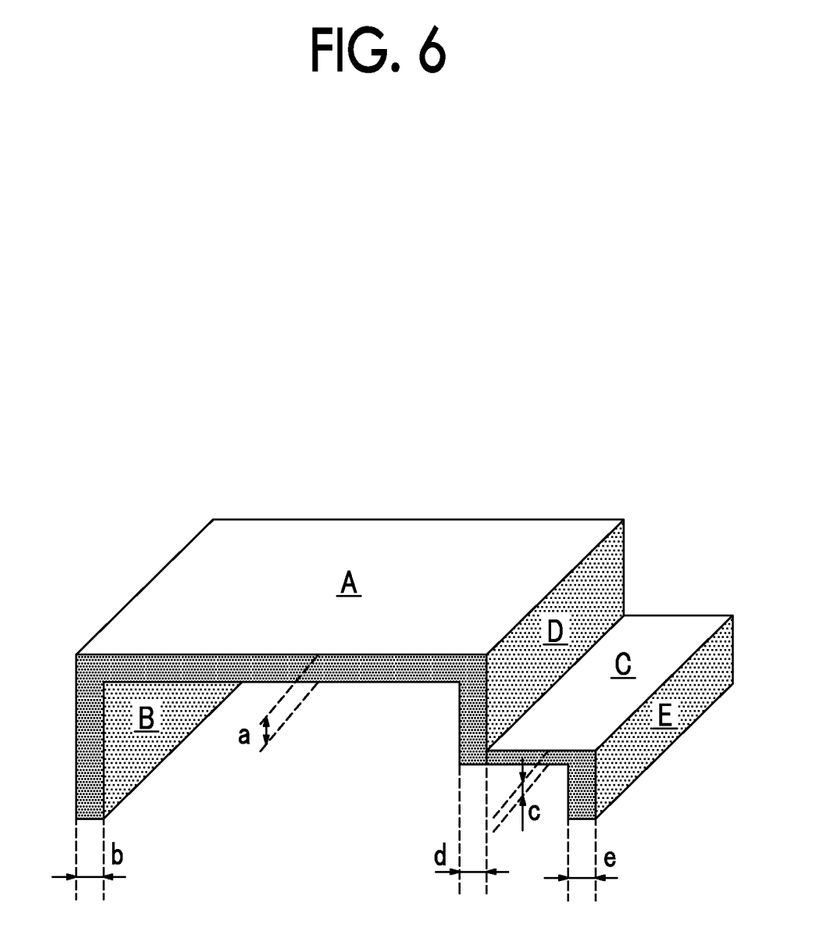
FIG. 6 is a view illustrating a determining method of a specific basic wall thickness by the basic wall thickness decision portion.

In the step 110, the basic wall thickness determining portion 26 evaluates the wall thickness having the largest surface area including the standing wall as the basic wall thickness, and a series of the basic wall thickness recognition processing is finished. For example, as illustrated in FIG. 6, regarding a plane A, a standing wall B, a plane C, a standing wall D, and a standing wall E, the size of each area surface satisfies plane A>standing wall B>plane C>standing wall D>standing wall E. In a case where the wall thickness of each of these is a, b, c, d, and e in order, when a wall thickness a (plane A) having the largest surface area including the standing wall has the surface area which is equal to or greater than two times as large as a wall thickness b (standing wall B) having the second largest surface area, the wall thickness a of the plane A is determined as the basic wall thickness. In other words, since the wall thickness having the largest surface area is considered as the basic wall thickness, the wall thickness a having the largest surface area is determined as the basic wall thickness.

Meanwhile, in the step 112, the basic wall thickness determining portion 26 evaluates whether or not the wall thickness having the largest surface area excluding the standing wall is equal to or greater than two times as large as the wall thickness having the second largest surface area. When the evaluation is positive, the process moves to a step 114, and when the evaluation is negative, the process moves to a step 116.

In the step 114, the basic wall thickness determining portion 26 determines the wall thickness having the largest surface area excluding the standing wall as the basic wall thickness, and a series of basic wall thickness recognition processing is finished. For example, as illustrated in FIG. 6, when the wall thickness a (plane A) having the largest surface area including the standing wall is less than two times as large as the wall thickness b (standing wall B) having the second largest surface area, and when the wall thickness a (plane A) having the largest surface area excluding the standing walls B, D, and E, is equal to or greater than two times as large as the wall thickness c (plane C) having the second largest surface area, the wall thickness a of the plane A is determined as the basic wall thickness.

Meanwhile, in the step 116, a thinnest wall thickness among the top three surfaces having the largest surface area including the standing wall is determined as the basic wall thickness, and a series of the basic wall thickness recognition processing is finished. For example, in FIG. 6, when the wall thickness a (plane A) having the largest surface area including the standing wall is less than two times as large as the wall thickness b (standing wall B) having the second largest surface area, and when the wall thickness a (plane A) having the largest surface area excluding the standing walls B, D, and E, is less than two times as large as the wall thickness c (plane C) having the second largest surface area, the wall thickness c of the plane C which is the thinnest wall thickness among the wall thickness a of the surface (plane A) having the largest surface area among the surfaces including the standing wall, the wall thickness b of the surface (plane B) having the second largest surface area, and the wall thickness c of the surface (plane C) having the third largest surface area, is determined as the basic wall thickness.

Figure 7:
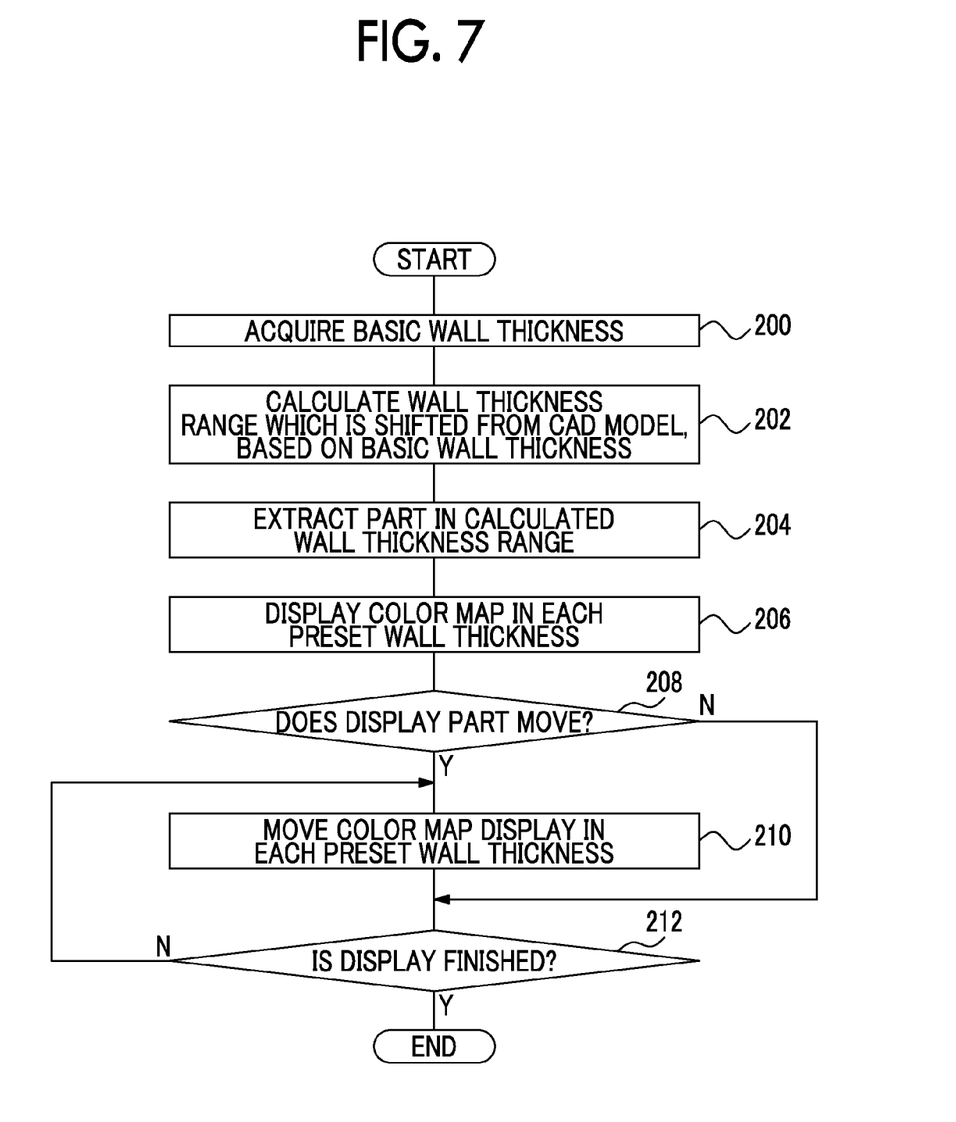
FIG. 7 is a flow chart illustrating an example of a flow of a wall thickness confirmation part derivation processing which is performed by a wall thickness confirmation part derivation portion and a display processing portion of the molding wall thickness recognition apparatus according to the exemplary embodiment.

Next, the wall thickness confirmation part derivation processing which is performed by using the basic wall thickness determined by the basic wall thickness recognition processing will be described. FIG. 7 is a flow chart illustrating an example of a flow of a wall thickness confirmation part derivation processing which is performed by the wall thickness confirmation part derivation portion 28 and the display processing portion 30 of the molding wall thickness recognition apparatus 12 according to the exemplary embodiment.

In a step 200, the wall thickness confirmation part derivation portion 28 acquires the basic wall thickness determined by the above-described basic wall thickness recognition processing of the basic wall thickness recognition portion 20, and moves to a step 202.

In the step 202, the wall thickness confirmation part derivation portion 28 calculates the wall thickness range which is shifted from a CAD model illustrated by the CAD information based on the acquired basic wall thickness, and moves to a step 204. In other words, the wall thickness confirmation part derivation portion 28 calculates the wall thickness having a possibility that a defect, such as sinking, is generated with respect to the basic wall thickness. In the exemplary embodiment, the basic wall thickness×A+B (A and B are respectively preset values), is calculated from basic wall thickness×A.

In the step 204, the wall thickness confirmation part derivation portion 28 extracts a part of the calculated wall thickness range from the CAD information, and moves to a step 206. In other words, the wall thickness confirmation part derivation portion 28 extracts the part of the wall thickness in a range from basic wall thickness×A to basic wall thickness×A+B (A and B are respectively preset values), from the CAD information.

Figure 8A:
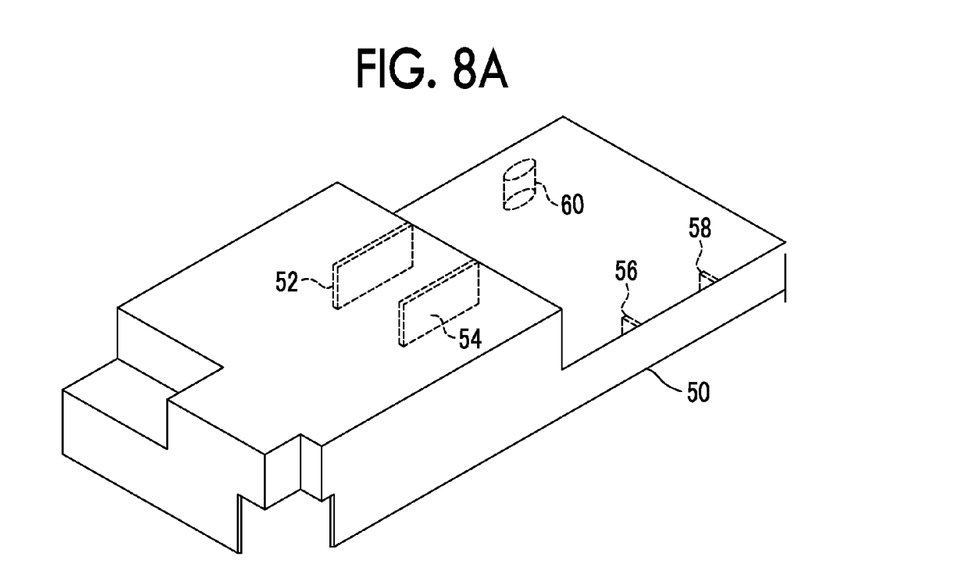
FIGS. 8A and 8B are views illustrating a display example by the display processing portion.
Figure 8B:
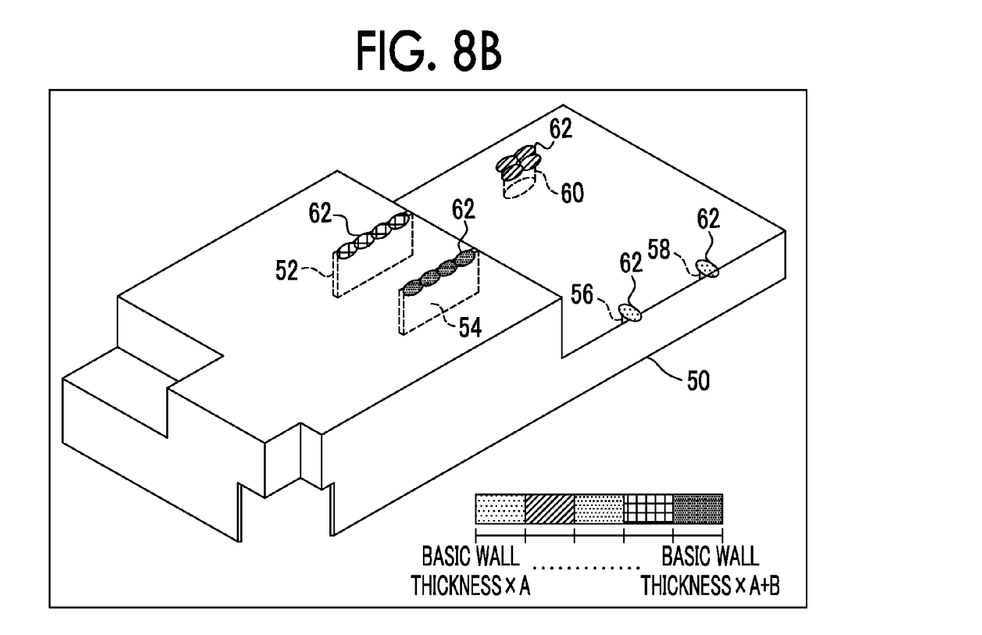

In the step 206, the display processing portion 30 displays a colormap in each preset wall thickness with respect to the part extracted in the step 204, and moves to a step 208. For example, as illustrated in FIG. 8A, regarding the shape of the molded article, an example in which ribs 52, 54, 56, and 58, and an embossed shape 60, or the like, exist in a case 50, is described. As illustrated in FIG. 8B, when each wall thickness is the wall thickness in a range from basic wall thickness×A to basic wall thickness×A+B, a mark 62 which has different colors which are preset according to each thickness by dividing the range of basic wall thickness×A+B from basic wall thickness×A at a preset distance, is displayed. Accordingly, when the molded article follows the model which is illustrated by the CAD information, and when it is confirmed that deformation, such as sinking, is not generated, a part of the displayed mark 62 may be confirmed. In addition, a mark in a different display state, such as the mark or the like having different shapes, may be displayed, not by different colors.

In the step 208, the display processing portion 30 evaluates whether or not the display processing portion 30 is commanded to move the display part. For example, by an operation portion, such as a keyboard or a mouse, it is evaluated whether or not a command of moving the current display part to another part is given. When the evaluation is positive, the process moves to a step 210, and when the determination is negative, the process moves to a step 212.

In the step 210, the display processing portion 30 moves a colormap in each preset wall thickness to the commanded part, and moves to a step 212.

In the step 212, the display processing portion 30 evaluates whether or not the display is finished. For example, it is evaluated whether or not an operation of commanding to finish displaying is performed by the operation portion, such as a keyboard or a mouse. When the evaluation is negative, the process goes back to the step 210 and the above-described processing is repeated, and when the evaluation is positive, a series of wall thickness confirmation part derivation processing is finished.

In addition, in the above-described exemplary embodiment, an example in which various programs are executed in the computer is described. However, a part of the processing or the entire processing which is executed by each program may be performed in hardware.

In addition, each processing performed by the molding wall thickness recognition apparatus 12 according to the above-described exemplary embodiment may be stored in a recording medium as a program and may be distributed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A molding wall thickness recognition apparatus, comprising:
    a processor configured to act as:
    a calculation portion that calculates a surface area of each surface that configures a molded article in each wall thickness, based on three-dimensional shape information which illustrates a shape of the molded article having different wall thicknesses; and
    a determining portion that determines the wall thickness of the surface area that satisfies preset conditions as a basic wall thickness, by comparing each surface area in each wall thickness calculated by the calculation portion,
    wherein, based on a calculation result of the calculation portion, when a surface area of a wall thickness a of a plane A having the largest surface area among the surfaces including a surface parallel to a demolding direction is equal to or greater than preset value times as large as a surface area of a wall thickness b of a plane B having a second largest surface area, the determining portion determines the wall thickness a as the basic wall thickness,
    wherein, when the surface area of the wall thickness a is less than the preset value times as large as the surface area of the wall thickness b, and when a surface area of a wall thickness d of a plane D having the largest surface area among the surfaces excluding the surface parallel to the demolding direction is equal to or greater than the preset value times as large as a surface area of a wall thickness e of a plane E having the second largest area, the determining portion determines the wall thickness d as the basic wall thickness, and
    wherein, when the surface area of the wall thickness a is less than the preset value times as large as the surface area of the wall thickness b, and when the surface area of the wall thickness d is less than the preset value times as large as the surface area of the wall thickness e, the determining portion determines a thinnest wall thickness among the wall thickness a of the plane A having the largest surface area among the surfaces including the surface parallel to the demolding direction, the wall thickness b of the plane B having the second largest surface area, and the wall thickness c of the plane C having the third largest surface area, as the basic wall thickness.

2. The molding wall thickness recognition apparatus according to claim 1,
    wherein the determining portion includes:
    a first evaluation portion, which evaluates whether or not the surface area of the wall thickness a of the plane A having the largest surface area among the surfaces including the surface parallel to the demolding direction is equal to or greater than preset value times as large as the surface area of the wall thickness b of the plane B having the second largest surface area, based on the calculation result of the calculation portion;
    a first determining portion which determines the wall thickness a as the basic wall thickness when the first evaluation portion evaluates that the surface area of the wall thickness a is equal to or greater than the preset value times as large as the surface area of the wall thickness b;
    a second evaluation portion which determines whether or not the surface area of the wall thickness d of the plane D having the largest surface area among the surfaces excluding the surface parallel to the demolding direction is equal to or greater than the preset value times as large as the surface area of the wall thickness e of the plane E having the second largest area, based on the calculation result of the calculation portion, when the first evaluation portion evaluates that the surface area of the wall thickness a is less than the preset two times as large as the surface area of the wall thickness b;

a second determining portion which determines the wall thickness d as the basic wall thickness when the second evaluation portion evaluates that the surface area of the wall thickness d is the preset value times as large as the surface area of the wall thickness e; and a third determining portion determines the thinnest wall thickness among the wall thickness a of the plane A having the largest surface area among the surfaces including the surface parallel to the demolding direction, the wall thickness b of the plane B having the second largest surface area, and the wall thickness c of the plane C having the third largest surface area, as the basic wall thickness, when the second evaluation portion evaluates that the surface area of the wall thickness d is less than the preset value times as large as the surface area of a wall thickness e.

3. The molding wall thickness recognition apparatus according to claim 2,
wherein the calculation portion includes a wall thickness recognition portion that extracts surface information from the three-dimensional shape information, causes the extracted surface to be irradiated with a virtual projection beam with respect to a normal line direction from a preset normal line arithmetic point, obtains a surface that intersects the projection beam, and recognizes a distance from the normal line arithmetic point to the obtained surface as the wall thickness.

4. The molding wall thickness recognition apparatus according to claim 3, further comprising:
a display portion that extracts and displays the wall thickness part which is predicted not to follow the three-dimensional shape information, based on the basic wall thickness determined by the three-dimensional shape information and the determining portion.

5. The molding wall thickness recognition apparatus according to claim 2, further comprising:
a display portion that extracts and displays the wall thickness part which is predicted not to follow the three-dimensional shape information, based on the basic wall thickness determined by the three-dimensional shape information and the determining portion.

6. The molding wall thickness recognition apparatus according to claim 1,
wherein the calculation portion includes a wall thickness recognition portion that extracts surface information from the three-dimensional shape information, causes the extracted surface to be irradiated with a virtual projection beam with respect to a normal line direction from a preset normal line arithmetic point, obtains a surface that intersects the projection beam, and recognizes a distance from the normal line arithmetic point to the obtained surface as the wall thickness.

7. The molding wall thickness recognition apparatus according to claim 6, further comprising:
a display portion that extracts and displays the wall thickness part which is predicted not to follow the three-dimensional shape information, based on the basic wall thickness determined by the three-dimensional shape information and the determining portion.

8. The molding wall thickness recognition apparatus according to claim 1,
wherein the calculation portion includes a wall thickness recognition portion that extracts surface information from the three-dimensional shape information, causes the extracted surface to be irradiated with a virtual projection beam with respect to a normal line direction from a preset normal line arithmetic point, obtains a surface that intersects the projection beam, and recognizes a distance from the normal line arithmetic point to the obtained surface as the wall thickness.

9. The molding wall thickness recognition apparatus according to claim 8, further comprising:
a display portion that extracts and displays the wall thickness part which is predicted not to follow the three-dimensional shape information, based on the basic wall thickness determined by the three-dimensional shape information and the determining portion.

10. The molding wall thickness recognition apparatus according to claim 1, further comprising:
a display portion that extracts and displays the wall thickness part which is predicted not to follow the three-dimensional shape information, based on the basic wall thickness determined by the three-dimensional shape information and the determining portion.

11. The molding wall thickness recognition apparatus according to claim 1, further comprising:
a display portion that extracts and displays the wall thickness part which is predicted not to follow the three-dimensional shape information, based on the basic wall thickness determined by the three-dimensional shape information and the determining portion.

12. A molding wall thickness recognition system, comprising:
a storage portion that stores the three-dimensional information which illustrates a shape of an molded article having different wall thicknesses; and
the molding wall thickness recognition apparatus according to claim 1.

13. A non-transitory computer readable medium storing a molding wall thickness recognition program that causes a computer to function as each part which configures the molding wall thickness recognition apparatus according to claim 1.

* * * * *